United States Patent [19]

Berkowitz et al.

[11] Patent Number: 5,003,314
[45] Date of Patent: Mar. 26, 1991

[54] DIGITALLY SYNTHESIZED PHASE ERROR CORRECTING SYSTEM

[75] Inventors: Bernard Berkowitz, San Diego; Mark E. Bonebright, La Mesa; William F. McNaul, Ramona; Michael L. Tentler, San Diego, all of Calif.

[73] Assignee: Cubic Defense Systems, Inc., San Diego, Calif.

[21] Appl. No.: 383,655

[22] Filed: Jul. 24, 1989

[51] Int. Cl.$^5$ .............................................. G01S 7/40
[52] U.S. Cl. ................................... 342/372; 342/174
[58] Field of Search ............... 342/173, 174, 165, 372, 342/376, 377

[56] References Cited

U.S. PATENT DOCUMENTS

| | | |
|---|---|---|
| H173 | 12/1986 | Claborn et al. |
| 3,646,558 | 2/1972 | Campanella ........................ 343/100 |
| 3,775,769 | 11/1973 | Heeren et al. ...................... 343/100 |
| 3,883,870 | 5/1975 | Kunz .................................. 343/17.7 |
| 4,176,354 | 11/1979 | Hsiao et al. |
| 4,394,659 | 7/1983 | Gellekink .......................... 343/16 |
| 4,445,119 | 4/1984 | Works ............................... 343/377 |
| 4,453,164 | 6/1984 | Patton . |
| 4,488,155 | 12/1984 | Wu . |
| 4,489,324 | 12/1984 | Blume ............................... 343/372 |
| 4,517,570 | 5/1985 | Gray, Jr. . |
| 4,520,361 | 5/1985 | Frazita .............................. 343/372 |
| 4,536,766 | 8/1985 | Frazita .............................. 343/372 |
| 4,578,680 | 3/1986 | Haupt ............................... 343/703 |

Primary Examiner—Thomas H. Tarcza
Assistant Examiner—Mark Hellner
Attorney, Agent, or Firm—Brown, Martin, Haller & McClain

[57] ABSTRACT

A system for correcting phase errors in a space based radar system utilizing probes located in front of an array of lens elements of a phased array antenna. Included is a mechanism for supplying a stored perfect value signal indicative of the distance between the probes and lens elements for a perfect, nondeformed array, and the mechanism for receiving radiated pilot signals to supply an actual value signal indicative of the actual distance between the probes and the lens elements to determine an amount of structural deformation. A mechanism is provided for measuring the difference in phase between the perfect value signal and the actual value signal to supply a deformation phase correction signal to adjust the beam steering command to correct for phase error introduced as a result of the measured structural deformation. Further disclosed is a system and method for effecting phase coherence across the array by utilizing a radiated reference pilot frequency pulse to each lens element. Any difference in phase between the measured reference pilot frequency pulse and a stored value is utilized to command a phase correction at each lens element utilizing a feedback loop for effecting phase coherence for the array, both on transmit as well as receive. Further disclosed is a method and system incorporating a digitally synthesized phase error correcting module with each lens element. In one embodiment, the correcting modules are dispersed among the lens elements utilizing an interpolation method for phase error correction.

8 Claims, 4 Drawing Sheets

DIGITALLY SYNTHESIZED PHASE ERROR CORRECTING SYSTEM

BACKGROUND OF THE INVENTION

1. Field of the Invention

This invention relates generally to phased array antennas. More particularly, this invention relates to a phased array antenna incorporating a phase error correction system in which phase adjustments are made to correct for array structural deformation, and individual array element phase errors. Phase adjustments are also made to affect phase coherence of all lens elements in the array by a feedback loop at each element.

2. Background Art

Phased array antennas are composed of a group of individual radiators distributed and oriented in a one or two dimensional spacial configuration. The amplitude and phase excitations of each radiator is individually controlled to form a radiated beam of any desired shape in space, such as a pencil beam or fan beam. The position of the beam in space is then controlled electronically by adjusting the phase of the excitation signals at each of the individual radiators. Computers are utilized to control the digital beam steering function for the phased array antenna. As is well known in the prior art, in general, most of the feed systems for forming beams for space based phased array antennas can be categorized into two basic groups, namely optical space feeds, and constrained feeds.

Figure 1A:
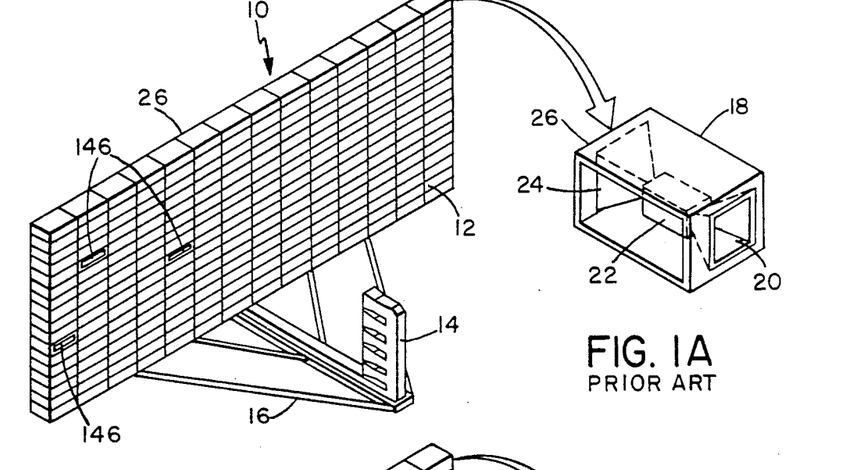
FIG. 1A is a perspective view of a prior art space fed phased array antenna utilizing conventional transmit/receive modules.

In optical space feeds, illumination of the array elements in an optically space fed antenna is accomplished by optically distributing the source signal (transmitter) through space for illuminating an array of pick-up horns or elements which are connected to the radiating elements. Two basic types of optical space feeds are the transmission type and reflection type. A conventional transmission type space feed is shown in FIG. 1A. While the advantage of the optical space feed is its simplicity, its major disadvantage is an excessive volume of physical space required to accommodate the feed system. Space feeds require large extended feeds which are essential to reduce beam sidelobes and reduce spill-over signals, but which are awkward to deploy in space. Furthermore large extended feeds present problems in beam steerage due to the displacement of the extended feed from its true focus position, and the difficulties in maintaining it at that position.

Figures 1B, 1C:
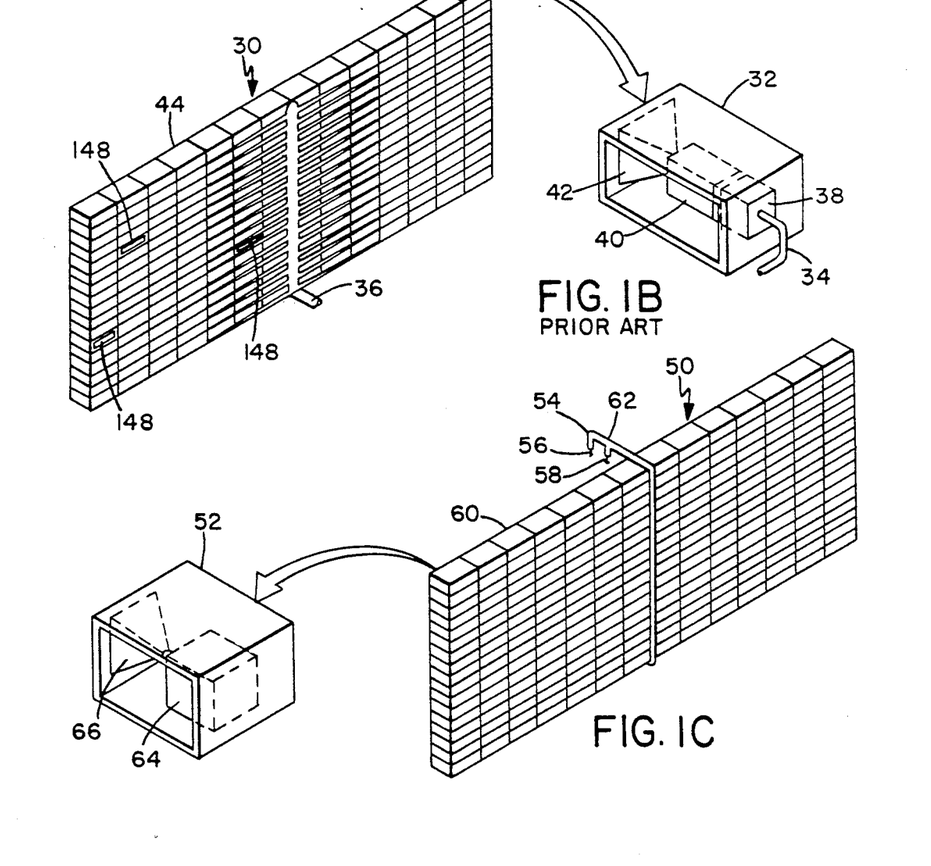
FIG. 1B is a perspective view of a prior art corporate fed phased array antenna utilizing conventional transmit/receive modules.
FIG. 1C is a perspective view of a preferred embodiment of the present invention utilizing a digitally synthesized phase error correcting transmit/receive module.

Constrained feeds utilize feed transmission lines to each element of the array. This is accomplished typically by end fed serial feed arrangements in which the elements are arranged serially along a main line, or a corporate fed arrangement where each lens element is individually fed from the energy source. A conventional corporate fed array is illustrated in FIG. 1B. In constrained feed systems the path length to each radiating element must be computed, and it is critical that the path length be correct to a very high degree. Unique to corporate or end fed arrays is the problem of maintaining of phase coherence to each element of the array through the feed transmission lines in the face of unequal exposure to the sun's radiations.

In addition, there are phase stability problems faced by any type of phased array antenna, whether space fed, corporate fed, end fed or otherwise. Phase stability problems can result from a change in array shape due to structural deformation and flexibility of the structures. These structural changes affect the signal path lengths, and thus cause unwanted shifts in signal phase resulting in phase errors. In addition to structural changes, there are varying phase shifts which are functions of temperature and aging of components. Such deformations and phase errors, if uncorrected, cause aperture phase errors which result in undesirable side lobes in the antenna beam.

Regarding space based radar systems utilizing phased array antennas, prior art systems are designed to minimize the large cost of placing a payload into orbit. Therefore, the antenna structures are typically designed to be as light in weight as possible. Unfortunately, such lightweight construction usually results in flexible antenna structures which are more prone to suffer deformations due to exposure to unequal solar radiations, heating, pressure, and orbital instabilities. Thus, the problems associated with phased array antennas for use in space based radar systems become even more acute.

The present invention recognizes the need for reducing feed tolerance problems of both space fed and corporate fed phased array lenses. In addition, the present invention automatically corrects for any remaining lens structural deformations in the phased array antenna, and compensates both for phase changes caused by component aging, and for phase changes caused by temperature changes or inequalities.

In light of the above, it therefore is an object of the present invention to provide a phase error correcting system which provides corrections in phase error due to any structural deformation of the phased array antenna.

It is a further object of the present invention to provide a phase error correcting system which compensates for phase changes caused by component aging, temperature changes or variations, or any other causes of phase error.

It is yet another object of the present invention to reduce the feed tolerance problems encountered in both space fed and corporate fed phased array lenses.

A further object of the present invention is to eliminate the extended feed and its large feed boom associated with space fed phased array lenses.

It is yet another object of the present invention to correct within a few electrical degrees for path length differences which may occur in corporate fed arrays.

It is an object of the present invention to compensate for all types of phase errors from which spaced based radar lens phased arrays suffer.

Yet another object of the present invention is to achieve array phase coherence on both transmit and receive pulses without using conventional space fed or corporate feeds.

It is yet a further object of the present invention to provide a phase error correcting system which is relatively easy to manufacture and which is cost effective in use.

SUMMARY OF THE INVENTION

The present invention is a system for correcting phase errors in a space based radar system utilizing a phased array antenna with an array of lens elements. It utilizes probes located in front of the lens elements for radiating pilot frequency signals. Included is a mechanism for supplying a stored perfect value signal indicative of the distance between the probe and the lens element for a perfect, nondeformed array; and a mechanism for receiving the radiated pilot signals to supply an actual value signal indicative of the actual distance between the probe and the lens element. A phase difference between the stored perfect signal and the actual value signal is used to determine the amount of structural deformation. A mechanism is provided for measuring the difference in phase between the perfect value signal and the actual value signal to supply a deformation phase correction signal. The deformation phase correction signal is used to adjust a beam steering command signal, to correct for phase error introduced as a result of the measured structural deformation at the lens element of the array.

There is further disclosed a system and method for effecting phase coherence across the array by utilizing a feedback loop at each element. Coherent phase control is effected by radiating a reference pilot frequency pulse from one probe to measure its phase at a given lens element. There the phase is compared with stored data representing element location, beam steerage phase, and correction for lens deformation. Any difference in phase between the measured reference pilot frequency pulse and a stored value is utilized to command a phase correction at each lens element for effecting phase coherence for the array. The system and method is similar with respect to reception as well as transmission of a coherent beam. If less than all lens elements are utilized, an interpolation process is utilized for strategically located lens elements incorporating the system of the present invention.

The present invention further discloses a method and system incorporating a digitally synthesized phase error correcting module located directly behind the radiating elements of the array which module includes a solid state high power amplifier, low noise amplifier, commutation switch, quadrature detector and an analog to digital converter. The module itself further may incorporate a direct digital synthesizer circuit incorporating a phase accumulator, sine wave look-up, read-only memory, digital multiplier, and digital to analog converter to serve as a simultaneous oscillator and phase shifter.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE PREFERRED EMBODIMENTS

Referring to FIG. 1A and 1B, there are shown illustrations of prior art phased array antenna structures. Space fed phased array antenna 10 has a feed face 12 which is illuminated by an extended horn feed 14 supported at the lens focus by a large support boom 16. The horn feed 14 may be comprised of an array of high power radiating elements. The distance of the horn feed from the lens is comparable to the dimensions of the lens aperture, with an f-number of 1.0 or typically even greater. The phased array antenna 10 is comprised of an array of individual lens elements 18. Each element 18 has a feed face antenna element 20 connected to a transmit/receive module 22 which is, in turn, connected to antenna elements 24 on the transmit face 26 of the antenna 10.

Referring to FIG. 1B, there is shown a representation of a corporate fed phased array antenna 30 which includes an array of lens elements 32. The corporate fed phased array antenna 30 has a network of cables 34 originating from a common primary feed source 36 and terminating at each lens element 32 of the corporate fed phased array 30. The radio frequency path lengths from the common primary feed source 36 to each of the elements 32 are precisely equal to within a few electrical degrees. Each lens element 32 includes a mode launcher 38 connected to a transmit/receive module 40, which is in turn, connected to an antenna element 42 on the transmit face 44 of the corporate fed phased array antenna 30. The transmit/receive modules 40 can be the same as transmit/receive modules 22 of the space fed phased array antenna 10. The common primary feed source 36 replaced the horn feed 14, the support boom 16, and feed face antenna element 20 in each lens element 18 of the space fed phased array antenna 10.

In a comparison of space fed versus corporate fed space based radar system phased array antennas, space fed arrays enjoy an advantage over practical corporate fed arrays in that their insertion loss is smaller. However, this advantage is reduced somewhat by the inclusion of low noise amplifiers among the transmit/receive module components. A further advantage of space fed arrays over corporate fed arrays is that the intervening space between the source and lens does not suffer the tolerance problems encountered by the transmission of corporate feed lines where all RF paths to the elements must be maintained equal within a few electrical degrees. The space fed array substitutes for the corporate feed problem, its own problem in that of attempting to maintain its extended feed at the focus of the lens. Of course, both the space fed and corporate fed arrays jointly suffer from errors due to lens structure warpage.

On the other hand, corporate fed arrays enjoy the avoidance of spillover power from which space fed arrays suffer when the array is illuminated by the feed horn radiated signal. Besides resulting in a power loss, spillover results in antenna pattern sidelobes appearing in the general direction of the main beam. These sidelobes increase the clutter power noise background competing with the desired signal return. Corporate fed arrays also enjoy the further advantages over space fed in their ability, such as by sub-arraying, to better handle dispersion problems, i.e. delays across the face of the lens when the main beam is scanned to wide angles off the normal to the array and to implement a displaced phase center array.

The magnitude of spillover for the space fed array may be reduced by employing an extended feed that is phased to produce a large illumination taper across the face of the lens. However, this technique results in a bulky feed structure, which necessitates employing a large support boom. A large f-number is thus required in order to minimize pattern phase aberrations which are encountered at wide scan angles. Another problem for the space fed array is that any lateral displacement of its feed from the focal point causes a beam steerage error, a significant factor when high precision beam pointing is required.

Maintaining the extended feed at its proper focus is difficult in a space environment which encounters unequal solar radiation on the relatively flimsy lens structure. U.S. Pat. No. 4,578,680 has for its objective the reduction of feed placement tolerances for a space fed lens array. It retains an extended feed whose misalignment with the lens orientation is compensated by phase adjustments made at radiator elements of the extended feed. The magnitudes of phase corrections are based upon optical measurements of distances from the feed to selected points on the lens structure or surface. The corrective approach taken by this patent thus retains the large, clumsy to package and heavy in weight, extended feed and feed boom, and cannot correct for errors arising at each element of the lens due to warpage of the lens structure.

The present invention enjoys advantages of the corporate fed arrays over space fed arrays to an even greater extent than corporate fed arrays because corrections can be made on an element-by-element basis, rather than on a sub-array basis.

The present invention utilizes digitally synthesized phase error correction transmit/receive modules arranged to form a phased array antenna for space based radar systems. The module concept of the present invention is applicable to both large planar and end-fire linear arrays. Utilizing the modules of the present invention avoids the necessity of holding structural tolerances normally required of space based radar lens arrays to achieve and maintain the low antenna sidelobe levels needed to suppress the adverse effect of ground clutter.

Furthermore, the present invention utilizes a feedback procedure which either directly establishes phase coherence across an array of radiating lens elements or permits such phase corrections to be made. When every element in the array includes a module of the present invention, direct establishment of phase coherence over the entire lens surface is enabled. When only a small fraction of the array elements contains such modules, phase coherence is enabled indirectly via a central computer which calculates phase corrections over the lens surface by interpolation. The former method results in a novel lens feed technique, the module fed lens; while the latter method enables phase corrections to be made either to a space fed or to a corporate fed lens, or even for a long linear array.

When modules of the present invention are implemented in a large space based radar lens array, many advantages over other types of arrays are realized. For example, a reduction in feed tolerance problems of both space fed and corporate fed phased array lenses is realized along with the ability to automatically correct for any remaining lens structural deformations. A further advantage of the present invention is the capability to compensate both for component aging phase changes and for phase changes caused by temperature changes or inequalities. Furthermore, it is capable of providing multiple, simultaneous, high-gain beams on reception. The present invention permits each of the above advantages to be achieved for many applications with a power consumption level which is both minimized and acceptable for spaceborne application.

It is envisioned that the modules of the present invention may be used at major collection centers, such as those utilized for a displaced phase center array and at subarray points of the lens, or even at each lens element. Phase corrections may be made either periodically or on a pulse-by-pulse basis.

Referring now to FIG. 1C, the present invention is illustrated in the form of a phase error correcting lens configuration of a phased array antenna 50. Antenna 50 is comprised of an array of lens elements 52 arranged along an array axis and spaced from each other by a given distance, as are the lens elements in the prior art arrays. In place of the boom 16 of the optical space feed array 10 of FIG. 1A, the antenna 50 utilizes a probe 54 comprising two small point source, low power omni feeds 56, 58. Omni feeds 56, 58 are located a short distance from the transmit face 60 of antenna 50 and are supported by a lightweight boom 62.

Omni feeds 56, 58 supply reference pilot signals to each of the lens elements 52 and are located such that the pilot signals illuminate the same face of the lens from which the main beam emanates, i.e. transmit face 60. Thereby, like the corporate fed phased array antenna, configuration of lens elements 52 completely eliminates the need for feed horn 14, support boom 16, and feed face antenna element 20 in each lens element of space fed phased array antenna 10 of FIG. 1A. Omni feed 56, 58 are supported at the bottom of the antenna 50, or alternatively from its top, or even from its side.

Each lens element 52 includes a digitally synthesized phase error correction transmit/receive module 64 connected to a radiating antenna element 66. As with all antenna elements mentioned hereinbefore, the radiating antenna element 66 radiates the beam of energy on transmit mode, and receives the reflected beam of energy on the receive mode. The phase error correcting module 64 can be utilized in each and every element as shown in the antenna 50 of FIG. 1C, or can be dispersed among selected elements of a conventional space fed or corporate fed lens arrangement, as will also be further described below. When the phase error correcting module 64 is utilized in all elements, as shown in FIG. 1C, it dispenses with the need for a space feed or a corporate feed which were previously necessary to achieve coherence. Thus, the phase error correcting module 64, as will be described below, is able to achieve coherence for both transmit and receive functions.

Figure 2:
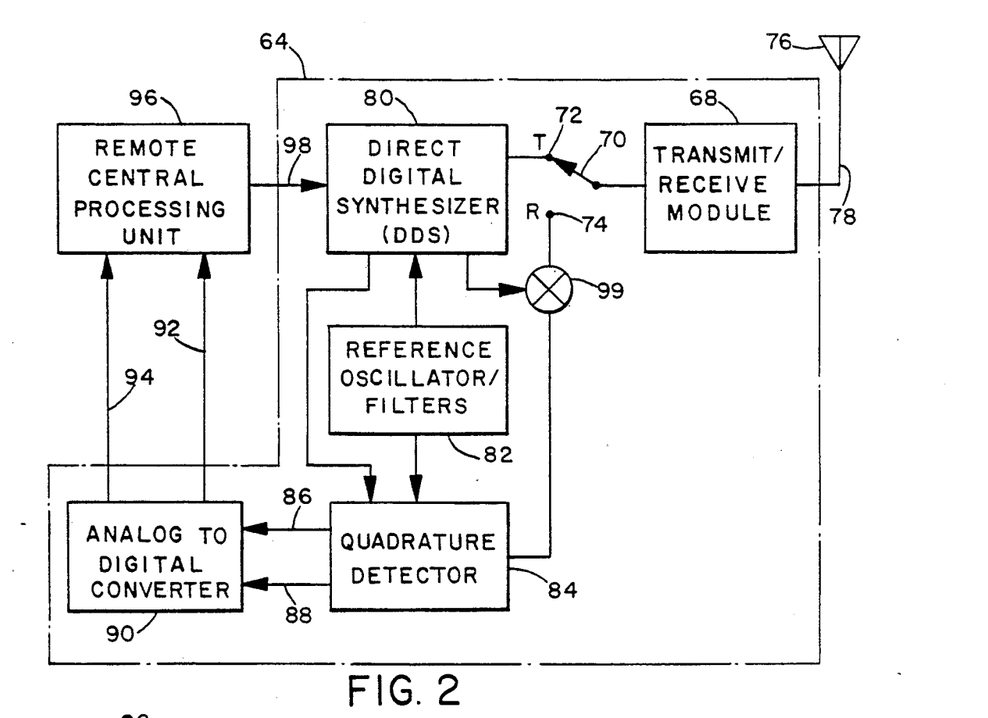
FIG. 2 is a block diagram of a digitally synthesized phase error correction module in accordance with the present invention.

In FIG. 2, there is shown a block diagram of the phase error correcting module 64 which replaces the typical space or corporate fed lens element transmit/receive module. A conventional transmit/receive module typically includes a solid state high power amplifier for transmission, a limiter and low noise amplifier for reception, and a commutation switch for selectively coupling the antenna element to the amplifier for transmission or the limiter for reception. The conventional transmit/receive module also typically includes a phase shifter or multibit attenuator whose function will be further explained below and various other circuitry.

Phase error correcting module 64 includes a transmit/receive element 68, which typically includes elements common to a conventional transmit/receive module such as a solid state high power amplifier (not shown), a limiter and low noise amplifier (not shown), and a switch (not shown) for coupling an antenna element to one of the high power amplifier or limiter. Phase error correcting module 64 also includes a switch 70 whose operation is well known for switching element 68 between a transmit function and a receive function by respectively coupling to a transmit point 72 or a receive point 74. Antenna element 76 is coupled via connection 78 to transmit/receive element 68. Unlike the conventional transmit/receive module, phase error correcting module 64 does not utilize a phase shifter and multibit attenuator.

Coupled to the transmit/receive element 68 is a direct digital synthesizer 80 which is coupled to a reference oscillator/filter 82 and a quadrature detector 84. The reference oscillator/filter 82 utilizes a common frequency oscillator to provide a clock frequency to the direct digital synthesizer 80, and to excite the reference signal for the quadrature detector 84. When used as an up converter, direct digital synthesizer 80 is capable of serving as a signal source for frequencies all the way from direct current to microwave bands.

The quadrature detector 84, having an in-phase bipolar output signal I and a quadrature bi-polar output signal Q are respectively coupled by lines 86 and 88 to the analog to digital converter 90. The digitized amplitudes of output signals I, Q are respectively coupled by lines 92 and 94 to a central processing unit (CPU) 96 located remote to the lens array.

The CPU 96 uses the inputs from modules 64 along with other data to control the phased array radar operations. The CPU 96 controls the phased array radar operations by a control signal which is coupled by line 98 to the direct digital synthesizer 80 utilizing the feedback mechanism as will be further explained below. Module 64 also includes a mixer 99 having an input coupled to receive point 74 and another input coupled to the output of direct digital synthesizer 80. The output of mixer 99 is coupled to the input of quadrature detector 84. Each phase error correcting module 64 is connected to the CPU 96 via a harness (not shown) which serves the dual purpose of delivering power from a central source (not shown), and of providing two-way digital code communications between the direct digital synthesizer 80 and the CPU 96. Such a harness is extremely light in weight compared with the corporate feed network cables 34 (FIG. 1B) which it replaces. The harness is typically a multiconductor circuit printed on a thin plastic sheet although it could be an electro-optical, or other type of data link.

In the transmit mode, the direct digital synthesizer 80 of the phase error correcting module 64 serves as a radio frequency signal source, a phase shifter and an attenuator having a resolution better than that of a conventional eight bit phase shifter. In the receive mode, the direct digital synthesizer 80 acts as a local oscillator and provides a reference signal for the quadrature detector 84.

Figure 3:
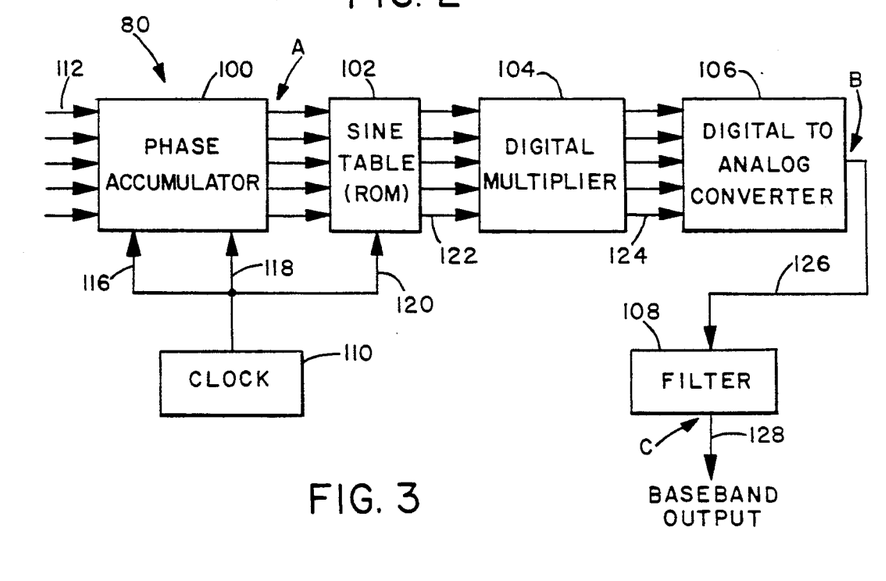
FIG. 3 is a block diagram of a direct digital synthesizer.
Figure 4:
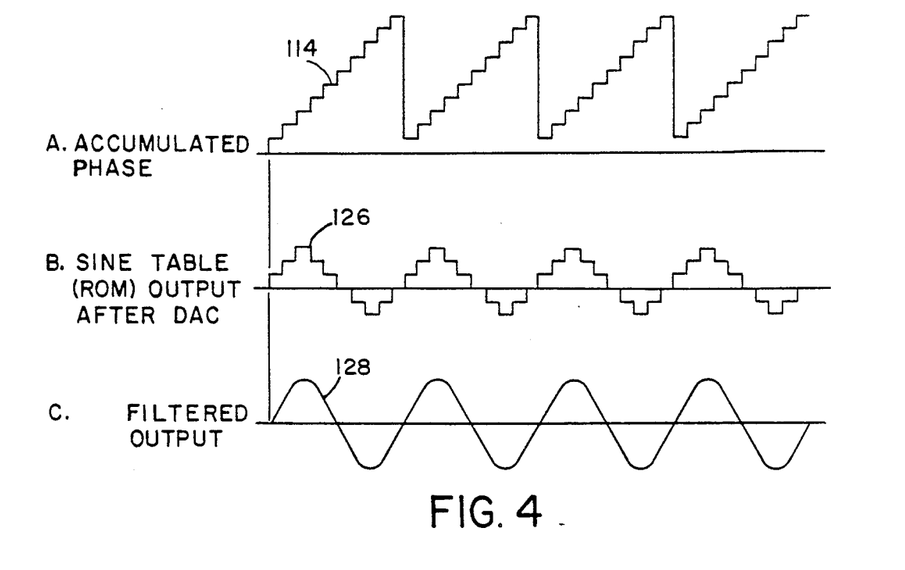
FIG. 4 is a series of graphs corresponding to waveforms relevant to the direct digital synthesizer of FIG. 3.

Referring to FIGS. 3 and 4, FIG. 3 illustrates a block diagram of the direct digital synthesizer 80 with graphical representation of signals at points A, B and C within the direct digital synthesizer 80 illustrated in FIG. 4. The basic block diagram and circuit functions shown in FIG. 3, include a phase accumulator 100, sine wave look-up table 102, typically in the form of a read-only memory, a digital multiplier 104, a digital to analog converter 106, and an output filter 108. Timing signals to phase accumulator 100, provided by a reference clock 110 determine its output value, permitting the frequency selection from sine wave look-up table 102.

In operation, discreet increment signals 112 are input the phase accumulator 100 and are accumulated into a step linear ramp of length equal to $2\pi$ radians, the slope of which corresponds to a phase rate of change which defines the output frequency. The accumulated phase signal output at point A is that shown by the graphical representation of accumulated phase signal 114 as graph A in FIG. 4. The phase accumulation signals are with reference to the reference clock signals 116, 118 and 120 originating from reference clock 110. The sine wave look-up table 102 translates the accumulated phase frequency indicated to a digital approximation of the output sine wave 126. The output signal 122 from the sine wave look-up table is input to digital multiplier 104 whose output signal 124 is an input to the digital to analog converter 106. The analog sine wave output 126 as indicated at point B is also in discreet steps and is graphically represented in graph B in FIG. 4. The sine wave output signal 126 is then input to filter 108 with the filtered output signal 128, indicated at point C, graphically represented in graph C of FIG. 4.

Delays in start-up time of the ramp of accumulated phase illustrated in graph 4A correspond to the phase delays of a phase shifter. Phase resolution of the direct digital synthesizer 80 depends solely on the number of digital steps accumulated per $2\pi$ radians. This resolution can be made as fine as may be desired. In addition to shifting phase, the direct digital synthesizer 80 also effectively serves as an efficacious digital attenuator. Selecting the number of attenuator bits readily permits the desired degree of amplitude control. This control is achieved by the digital multiplication of the signal at the output of the sine look-up table 102 prior to application of the digital to analog converter 106. Thus, the direct digital synthesizer 80 of the phase error correcting module 64 can effectively serve as a signal source and effectively control both amplitude and phase for the transmit waveform of the phased array.

Figure 5A:
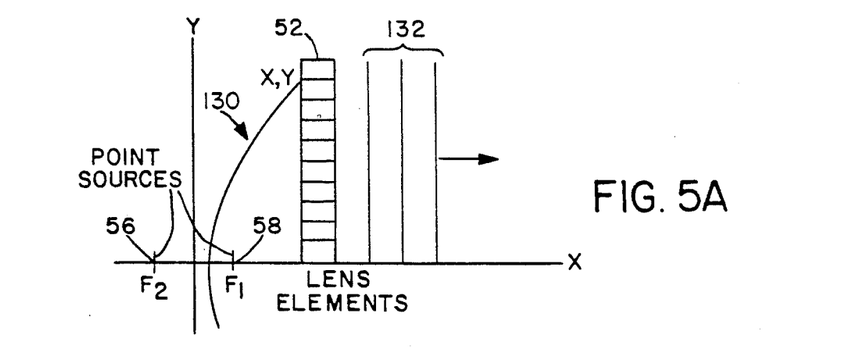
FIG. 5A is a schematic representation of a perfect unwarped phased array lens.
Figure 5B:
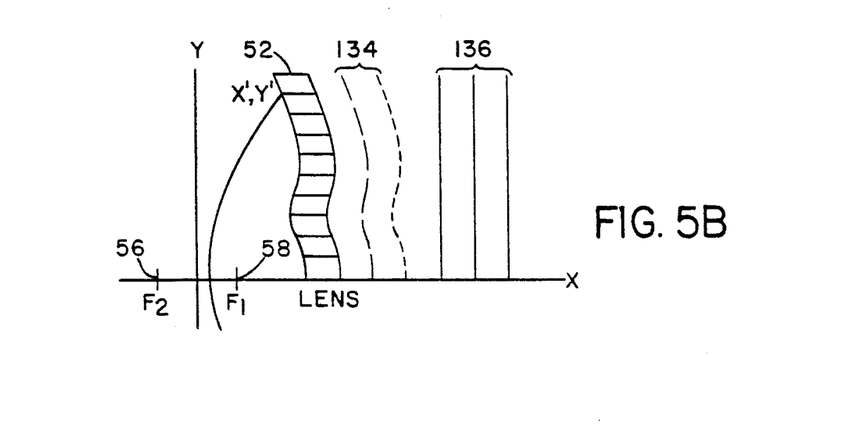
FIG. 5B is a schematic representation of a warped phased array lens configuration.

Referring now to FIGS. 5A and 5B, there is shown a graphical representation of the relationship between the phased array lens elements 52 and the low power omni feed point sources 56 and 58 of FIG. 1C. Omni feed sources 56 and 58 respectively correspond to point sources $F_2$ and $F_1$ in FIGS. 5A and 5B. FIG. 5A indicates a cross-section of a two-dimensional planar array in which the lens elements are in perfect alignment for an unwarped perfect lens array face. For analysis, an X-Y coordinate system is selected whose origin is located halfway between the two low power omni feed point sources 56 and 58, as shown by point sources $F_2$ and $F_1$, respectively. The two omni feed sources 56, 58 are located at the two foci $F_2$, $F_1$ of a hyperbola 130 which passes between the foci and which also passes through the center of each lens element 52 on one face of the perfect nondistorted lens array. The formula for a hyperbola is given by the following equation:

$$\left(\frac{x}{a}\right)^2 - \left(\frac{y}{b}\right)^2 = 1.0 \quad (1)$$

where the constants a and b of the equation for the hyperbola uniquely determine the X and Y coordinates at the lens front face for every element of the array.

The differences in distances from an element of the array to each of the omni feed point sources 56 and 58, which correspond to the foci $F_2$ and $F_1$ of the hyperbola, is a known constant. This known constant depends solely upon the values of a and b in accordance with the above formula. This difference in distance translates to a difference in phase given by the following equation:

$$\Delta\phi = \frac{4\pi a}{\lambda} \quad (2)$$

where a is the constant of the hyperbola.

The difference in phase for a perfect lens for each lens element is thus a constant, and this value can be calculated and stored in computer memory. Thus, the hyperbola 130 which defines the location of the lens element with respect to the foci is known. The phase front 132 of a perfect lens array is uniform as shown.

In FIG. 5B, it is further shown that the lens element 52 for a structurally deformed or warped lens array is at an actual location having actual coordinates X' and Y', which are different from the perfect unwarped lens coordinates of X, Y. Thus, the warped lens will have a different phase difference given by the equation:

$$\Delta\phi' = \frac{4\pi a'}{\lambda} \quad (3)$$

Measurement of $\Delta\phi'$ thus represents the difference in distance due to the hyperbola configuration with respect to the foci $F_1$ and $F_2$. As will be later explained in the operation of the invention, the uncorrected phase front 134 can be restored and corrected as shown by phase front 136 of FIG. 5B.

The phase error correction module, by commanding a phase shift of its direct digital synthesizer, is able to correct for the phase error introduced by the lens warpage. The CPU 96, which calculates the values of phase for each element of the array in order to steer the beam, also incorporates in its steering command the appropriate phase correction for warpage.

The appropriate correction must be added to the commanded beam steerage phase of each element for a beam steered off the normal to the array. The off-normal beam steering is illustrated in FIG. 5, wherein d is the element separation, s is the lateral offset due to warpage error, t is the beam steerage phase, and $\theta$ is the azimuth angle of the main beam 140 off the normal to the array. The correction is added as the conjugate of the phase error measured by the warpage. The total phase commanded, $\phi$, is thus given by the equation:

$$\phi = \frac{2\pi}{\lambda} (d \sin\theta - s \cos\theta). \quad (4)$$

The main beam 140 is thus also corrected for warpage error for each element.

Phase corrections of lens array deformation can be accomplished by including a phase error correcting module at each element of the lens array, or by including a module only at selected elements with an interpolation correction method. For interpolation correction, the phase error correcting modules can be employed in only a small percentage of the total number of lens elements. These are placed at structurally significant locations closely related to the lens surface warpage, or located at random over perhaps one percent of the total number of lens elements. Phase corrections for elements located at points intermediate to those measured are then calculated by interpolation by the CPU. If the phase error correcting module is included in each lens element, there is an added advantage in that it further permits coherent phase error computer correction as will be explained hereinbelow.

OPERATION

In order to effect structural deformation phase error correction, the phase error correcting module 64 first corrects for any phase errors at each element of the array which may have arisen from lens structural deformations. These deformations may change from time to time in a space environment, and associated errors may be compensated as often as desired, even on a pulse by pulse basis. Phase error correction is accomplished at a pilot frequency by measuring the path length difference between each lens element 52 of the array to the two omni feed point sources 56, 57.

Figure 7:
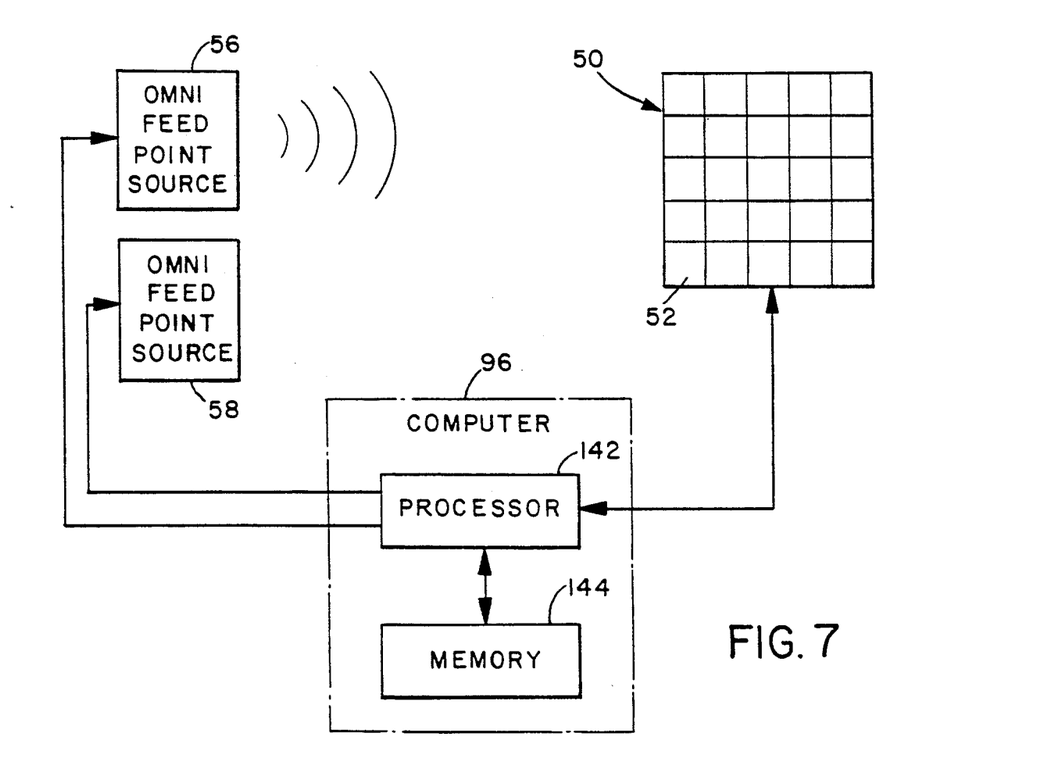
FIG. 7 is a block diagram of the overall phase error correction system.

FIG. 7 illustrates in schematical form the feedback loop in which phase error correction is accomplished. CPU 96 which includes a processor 142, operating under program instructions stored in memory 144 also in CPU 96, sets the phase error correcting module 64 (FIG. 2) to a receive mode. Switch 70 (FIG. 2) is set to connect transmit/receive module 68 to one input of mixer 99 while the direct digital synthesizer 80 (FIG. 2) is commanded by CPU 96 to generate a radio frequency signal at the pilot frequency. Radio frequency pulses are generated and emitted in sequence from each of the two sources 56, 57 which illuminate each element of the array 50. The pilot frequency pulse is first radiated from one of the two omni feed point sources 56, 58 and then received by each lens element 52. The relative phase of each received signal is then measured with respect to an element reference frequency, provided by the direct digital synthesizer elements, and passed along to CPU 96. The pilot frequency pulse is then radiated from the other of point sources 56, 57 with relative phase again measured.

For a perfect nondeformed lens, as shown in FIG. 5A, the phase difference between the two measurements is a known magnitude depending on geometry and frequency, as discussed above, which is stored in memory 144. If the actual measured phase difference does not agree with the perfect phase measurement, the actual value is also stored in memory 144 for use during the subsequent phase adjustment by CPU 96.

Thus, utilizing the phase error correcting modules at strategic locations in either a conventional space fed or corporate fed array, such as shown at random locations 146 of FIG. 1A, or 148 or FIG. 1B, phase error correction for structural deformation can be effected. In the event the phase error correcting module is utilized in each lens element, further benefits of the present invention can be recognized with respect to establishing phase coherence.

Phase coherence is accomplished by using the phase error correcting configuration of phased array antenna 50 as shown in FIG. 1C. The phase and amplitude measured for each lens element 52 are sent respectively as digital I and Q values on lines 92 and 94 (FIG. 2) via a multiconductor circuit to the CPU 96 (FIG. 2) for signal processing. It is important to note that the path length from the CPU to the individual elements over the harness is not held to the picosecond accuracy as required of the prior art corporate feed type systems. Phase coherence, however, does require picosecond accuracy on both reception and transmission. This accuracy is achieved in the present invention for both reception and transmission as follows.

Attainment of coherence requires that all direct digital synthesizers operate at the same frequency and appropriate phases. To achieve phase control, a reference pilot frequency pulse is radiated from one of the two omni feed probes 56, 57. It is preferred that the most remote probe omni feed, i.e. 56, be utilized for better reception. With reference to FIG. 3, the reference pilot frequency pulse received at each phase error correcting module 64 is processed on reception just as if it were a target return signal. The received signal is processed through the module circuitry and its phase relative to that generated by the direct digital synthesizer 80 is measured at the quadrature detector 84. The output from quadrature detector 84 is sent via the analog to digital converter 90 to the CPU 96. At CPU 96 the phase of the reference pilot frequency pulse is compared with a value stored in memory 144 (FIG. 7) which includes the x,y coordinate location of the particular lens element, the beam steerage phase, and the correction for lens warpage. Any difference in phase between the measured reference pilot frequency phase and the stored value is processed by the CPU to command a correction in phase at each direct digital synthesizer 80. Thus, a feedback loop is formed which effects phase coherence for each and every lens element. It has been shown a direct digital synthesizer oscillator can provide sufficient accuracy at radar frequencies. For example, phase errors of only 3.6° at a frequency of 1 GHz, may be realized and less at lower frequencies.

Figure 6:
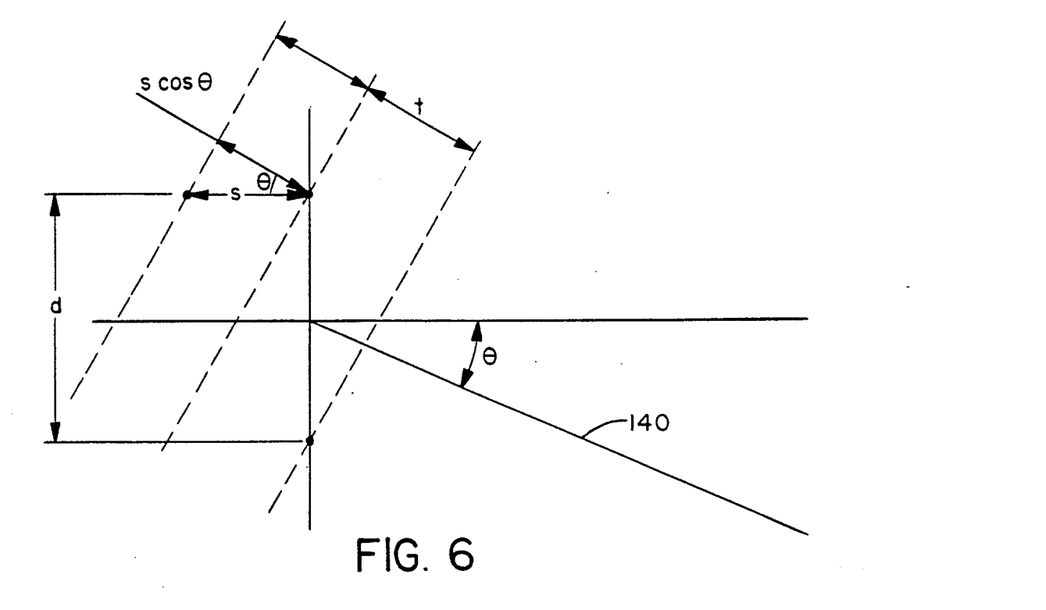
FIG. 6 is a graphical representation of the phase error correction signals with respect to beam steering angle signals.

The establishment of a coherent frequency and proper phase prior to transmission follows identical steps as for reception described above, except as distinguished herein. Both transmission and reception commence by transmitting a low power pilot frequency pulse at the desired transmission frequency for effecting coherence by closing the loop with commands from the CPU 96. Thus, the feedback loop operation as described herein achieves coherent radiation of all direct digital synthesizer sources in a plane transverse to the direction of propagation of the radar beam, as shown in FIG. 6. After coherence is established at low power and the pilot frequency is turned off the high power amplifier in the phase error correcting module is turned on. This procedure does not disturb the phase or frequency of the direct digital synthesizers which continue to run undisturbed. A high power radio frequency beam propagating in a specified direction can then be formed, as coherently summed from all lens elements 52.

Upon completion of the transmit pulse, the antenna can be returned to a receive mode and the signals from all of the lens elements can be stored for phase correction and processing upon reception. The information stored with respect to the phase error corrections which need to be made is totally independent from the path lengths between the element 52 and the CPU 96. Thus, variations in path length of the ribbon from each lens to the input at the CPU 96 do not contribute to errors in the encoded I and Q values, as such variations in length would for a conventional corporate feed.

While the particular digitally synthesized phase error correcting system as herein shown and disclosed in detail is fully capable of obtaining the objects and providing the advantages herein before stated, it is to be understood that it is merely illustrative of the present preferred embodiments of the invention and that no limitations are intended to the details of construction or design herein shown other than as defined in the appended claims.

We claim:

1. An apparatus for correcting phase errors in a space based radar of the type utilizing a phased array antenna having an array of transmit and receive lens elements coupled to a computer capable of supplying beam steering phase command signals to the lens elements, comprising:

probe means located in front of said lens elements for generating and radiating pilot frequency signals;

actual value means associated with each of said lens elements for, generating a reference frequency signal, receiving said radiated pilot signals and generating an actual value signal indicative of an actual distance between said probe means and a corresponding lens element;

perfect value storage means in said computer for storing a plurality of perfect values each corresponding to a respective one of said lens elements, each perfect value indicative of a perfect distance between said probe means and a lens element for a structurally perfect, nondeformed array and for providing an output of each perfect value as a corresponding reference value signal;

processor means in said computer for receiving and comparing each corresponding pair of perfect value and actual value signals, and generating a deformation phase correction value corresponding to the difference in said actual distance and said perfect distance, said computer using said deformation phase correction value for adjusting the beam steering command signal supplied to said lens element to correct for phase error introduced as a result of structural deformation of the array of lens elements.

2. An apparatus as recited in claim 1, further comprising coherent phase control means, wherein said coherent phase control means includes:

said probe means further being associated with each said lens element and having means for radiating a phase coherence pilot signal;

means in said computer for storing for each of said lens element a phase reference value indicative of each lens element location in the array, a beam steerage phase value, and corresponding phase correction value;

means for generating signals having a specified frequency and phase associated with each of said lens elements; and means for receiving and measuring the phase of said phase coherence pilot signal and for providing a phase coherence correction signal indicative of the difference between said stored phase reference value and said measured phase of said received coherence pilot signal, said signal generating means for receiving each of said phase coherence correction for modifying the phase of the signal generated for each lens element associated therewith.

3. An apparatus as recited in claim 2, wherein said probe means comprises a first point source and a second point source located at the respective foci of a hyperbola which passes through the center of a lens element.

4. An apparatus as recited in claim 1, wherein said actual value means is associated with a plurality of lens elements placed at a plurality of locations in said array, and wherein said processor means further includes means for interpolating phase corrections located at lens elements at points intermediate said plurality of lens elements.

5. An apparatus as recited in claim 4, wherein said plurality of lens elements are randomly dispersed among the array.

6. A method for correcting phase errors in a space based radar incorporating a phased array antenna having a planar array of transmit and receive lens elements, and further having a probe located in front of the lens elements for emitting pilot reference signals, the method comprising the steps of:
    (a) storing a perfect value of signal phase difference representing the distance between the probe and a specified lens element of the array for a perfect nondeformed array;
    (b) emitting a pilot reference signal from the probe for being received at said specified lens element;
    (c) measuring an actual value of signal phase difference representing the actual distance between the probe and said specified lens element of the array for a structurally deformed array;
    (d) calculating the difference between said measured actual value and said stored perfect value for determining an amount of phase correction for deformation at said specified lens element; and
    (e) adding said amount of phase correction for deformation at said lens element to a commanded beam steerage phase for said specified element.

7. A method as recited in claim 6, further comprising the steps of:
    (a) radiating from the probe to each of said lens elements a phase coherent pilot signal;
    (b) receiving at each of said elements said phase coherent pilot signal for measuring the phase thereof and supplying to the computer a phase coherent correction signal indicative of the difference between said stored perfect value and said measured phase coherent pilot signal value; and
    (c) supplying to said computer a phase coherent correction signal to effect phase coherence for all said lens elements.

8. A digitally synthesized phase error correction transmit and receive module for use in a space based radar of the type utilizing a phased array antenna having an array of lens elements coupled to a computer capable of supplying beam steering phase command signals to the lens elements, comprising:
    a switch for selecting between transmit and receive;
    a direct digital synthesizer coupled to said switch, said direct digital synthesizer serving as a radio frequency signal source, phase shifter and attenuator on transmit, and serving as an oscillator and a signal reference on receive;
    a quadrature detector coupled to said synthesizer;
    a reference oscillator and filter coupled to said synthesizer and said quadrature detector for exciting the reference signal for the quadrature detector and providing a clock frequency to the synthesizer;
    an analog to digital converter coupled to said quadrature detector for digitizing the output of the quadrature detector, said analog to digital converter supplying an output signal indicative of the amplitude and phase for use as an input to a central processing unit to control the phased array radar by means of a feedback loop at each such module.

* * * * *